(12) United States Patent
Bakos et al.

(10) Patent No.: US 12,472,029 B2
(45) Date of Patent: Nov. 18, 2025

(54) PARTICULATE COLLECTOR COVERS

(71) Applicant: CILAG GMBH INTERNATIONAL, Zug (CH)

(72) Inventors: Gregory J. Bakos, Mason, OH (US); Devanathan Raghavan, Mason, OH (US); Karl W. Mueller, Cincinnati, OH (US); Steve L. Slader, Liberty Township, OH (US); Thomas W. Lytle, Liberty Township, OH (US); Harry Payne, Loveland, OH (US)

(73) Assignee: CILAG GMBH INTERNATIONAL, Zug (CH)

( * ) Notice: Subject to any disclaimer, the term of this patent is extended or adjusted under 35 U.S.C. 154(b) by 106 days.

(21) Appl. No.: 18/531,029

(22) Filed: Dec. 6, 2023

(65) Prior Publication Data

US 2025/0186155 A1 Jun. 12, 2025

(51) Int. Cl.
| | |
|---|---|
| *A61B 17/072* | (2006.01) |
| *A61B 50/30* | (2016.01) |
| *A61B 90/00* | (2016.01) |
| A61B 17/00 | (2006.01) |
| A61B 17/068 | (2006.01) |
| A61B 34/30 | (2016.01) |

(52) U.S. Cl.
CPC ............ *A61B 90/03* (2016.02); *A61B 17/072* (2013.01); *A61B 17/07207* (2013.01); *A61B 50/30* (2016.02); *A61B 2017/00477* (2013.01); *A61B 17/068* (2013.01); *A61B 2017/07214* (2013.01); *A61B 34/30* (2016.02); *A61B 2090/038* (2016.02); *A61B 2090/0813* (2016.02)

(58) Field of Classification Search
CPC ............... A61B 17/068; A61B 17/072; A61B 17/02707; A61B 17/115; A61B 2017/00477; A61B 2017/07214; A61B 2017/07228; A61B 34/30; A61B 34/31; A61B 90/00; A61B 90/03; A61B 50/30
USPC ..... 227/19, 175.1, 176.2, 180.1; 606/1, 139, 606/219; 173/170
See application file for complete search history.

(56) References Cited

U.S. PATENT DOCUMENTS

| | | | |
|---|---|---|---|
| 4,527,724 A * | 7/1985 | Chow | A61B 17/072 227/19 |
| 2004/0112985 A1* | 6/2004 | Malek | E03C 1/08 239/445 |
| 2009/0137887 A1* | 5/2009 | Shariati | A61B 5/14542 600/345 |

(Continued)

*Primary Examiner* — Scott A Smith
(74) *Attorney, Agent, or Firm* — Troutman Pepper Locke LLP

(57) ABSTRACT

The disclosed technology includes a surgical instrument that may include a hollow housing, a trigger, and a particulate skirt. The hollow housing may include a first shell and a second shell that form an actuating mechanism space therebetween. The hollow housing may also include a handle portion and a first opening that can be formed at a first interface point of the first shell and the second shell. The trigger may extend from the first opening of the hollow housing. The particulate skirt may be configured to capture particulate from the actuating mechanism space and prevent the particulate from exiting the housing through the first opening. The particulate skirt may include a trigger aperture that can be sized and shaped to accept at least a portion of the trigger therethrough.

14 Claims, 8 Drawing Sheets

(56) References Cited

U.S. PATENT DOCUMENTS

| | | | |
|---|---|---|---|
| 2009/0178459 A1* | 7/2009 | Li | C12Q 1/001 |
| | | | 73/1.02 |
| 2014/0257313 A1* | 9/2014 | Frey | A61F 2/4455 |
| | | | 606/90 |
| 2016/0007983 A1* | 1/2016 | Frey | A61B 17/7077 |
| | | | 606/86 A |
| 2016/0249915 A1* | 9/2016 | Beckman | A61L 2/00 |
| | | | 227/175.1 |
| 2020/0405401 A1* | 12/2020 | Shelton, IV | A61B 90/361 |
| 2022/0330958 A1* | 10/2022 | Mobley | A61M 1/65 |
| 2022/0409298 A1* | 12/2022 | Haider | A61B 34/37 |
| 2022/0409830 A1* | 12/2022 | Shahaf | B05B 11/062 |
| 2025/0186155 A1* | 6/2025 | Bakos | A61B 17/072 |

* cited by examiner

PARTICULATE COLLECTOR COVERS

FIELD

The present invention relates generally to particulate collector covers for surgical instruments and more specifically a particulate skirt utilized to mitigate egress of particulate from a surgical instrument.

BACKGROUND

During the transportation and manufacturing of a surgical instrument, debris or particulate may be generated and move loosely within internal cavities of said surgical instrument. Resultantly, such as in the case of a surgical stapler, a practitioner may observe particulate egressing from one or more trigger openings while unpackaging the surgical stapler. The practitioner, upon observing the particulate egressing from the surgical stapler, may develop concerns about the operability of the surgical stapler, causing the practitioner to discard the device. The challenges presented due to particulate egress result in decreased trust in the operability of surgical instruments, fiduciary consequences from discarding surgical instruments perceived as defective.

One way to reduce the generation of particulate on sealed surgical instruments is enforcing strict quality control procedures during manufacturing and assembly of surgical instruments. A problem with this approach, however, is that particulate can be generated during transportation and shipment of surgical instruments. In other words, although particulate may be mitigated during manufacture of the surgical instruments, particulate may still be generated and resultantly may egress from the surgical instrument during unpackaging.

Thus, there still exists a need for devices and methods of manufacture to mitigate the generation of particulate within surgical instruments during manufacturing, transportation, and unpackaging. The technology disclosed herein addresses the aforementioned challenges.

SUMMARY

There is provided, in accordance with an example of the present technology, a surgical instrument that may include a hollow housing, a trigger, and a particulate skirt. The hollow housing may include a first shell and a second shell that form an actuating mechanism space therebetween. The hollow housing may also include a handle portion and a first opening that can be formed at a first interface point of the first shell and the second shell. The trigger may extend from the first opening of the hollow housing. The particulate skirt may be configured to capture particulate from the actuating mechanism space and prevent the particulate from exiting the housing through the first opening. The particulate skirt may include a trigger aperture that can be sized and shaped to accept at least a portion of the trigger therethrough.

This is provided, in accordance with an example of the present technology, a method of manufacturing a surgical instrument. The method may include assembling a surgical instrument, wherein the surgical instrument may include a hollow housing, a trigger, and a particulate skirt. The hollow housing may also include a handle portion and a first opening that can be formed at a first interface point of the first shell and the second shell. The trigger may extend from the first opening of the hollow housing. The particulate skirt may be configured to capture particulate from the actuating mechanism space and prevent the particulate from exiting the housing through the first opening. The particulate skirt may include a trigger aperture that can be sized and shaped to accept at least a portion of the trigger therethrough.

The method may also include connecting the second shell of the housing to the first shell of the housing. The method may also include removably attaching a particulate skirt proximate the trigger such that a first side of the particulate skirt is positioned toward a first opening of the surgical instrument.

Additional features, functionalities, and applications of the disclosed technology are discussed in more detail herein.

DETAILED DESCRIPTION

The following detailed description should be read with reference to the drawings, in which like elements in different drawings are identically numbered. The drawings, which are not necessarily to scale, depict selected examples and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives, and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 71% to 110%. In addition, as used herein, the terms "patient," "host," "user," and "subject" refer to any human or animal subject and are not intended to limit the systems or methods to human use, although use of the subject invention in a human patient represents a preferred embodiment. As well, the term "proximal" indicates a location closer to the operator or physician whereas "distal" indicates a location further away to the operator or physician.

As discussed herein, "adhesive" can include a substance, chemical, or force that is capable of holding two materials and resisting separation. In other words, "adhesive" or "adhesiveness," with respect to the present disclosure, can be understood to be as any substance, chemical, or force that may provide the capability of holding one or more materials together by way of surface attachment and thereby resist separation.

As discussed herein, "physician" can include a doctor, surgeon, technician, scientist, operator, or any other individual or delivery instrumentation associated with use of a surgical stapler.

Figure 1:
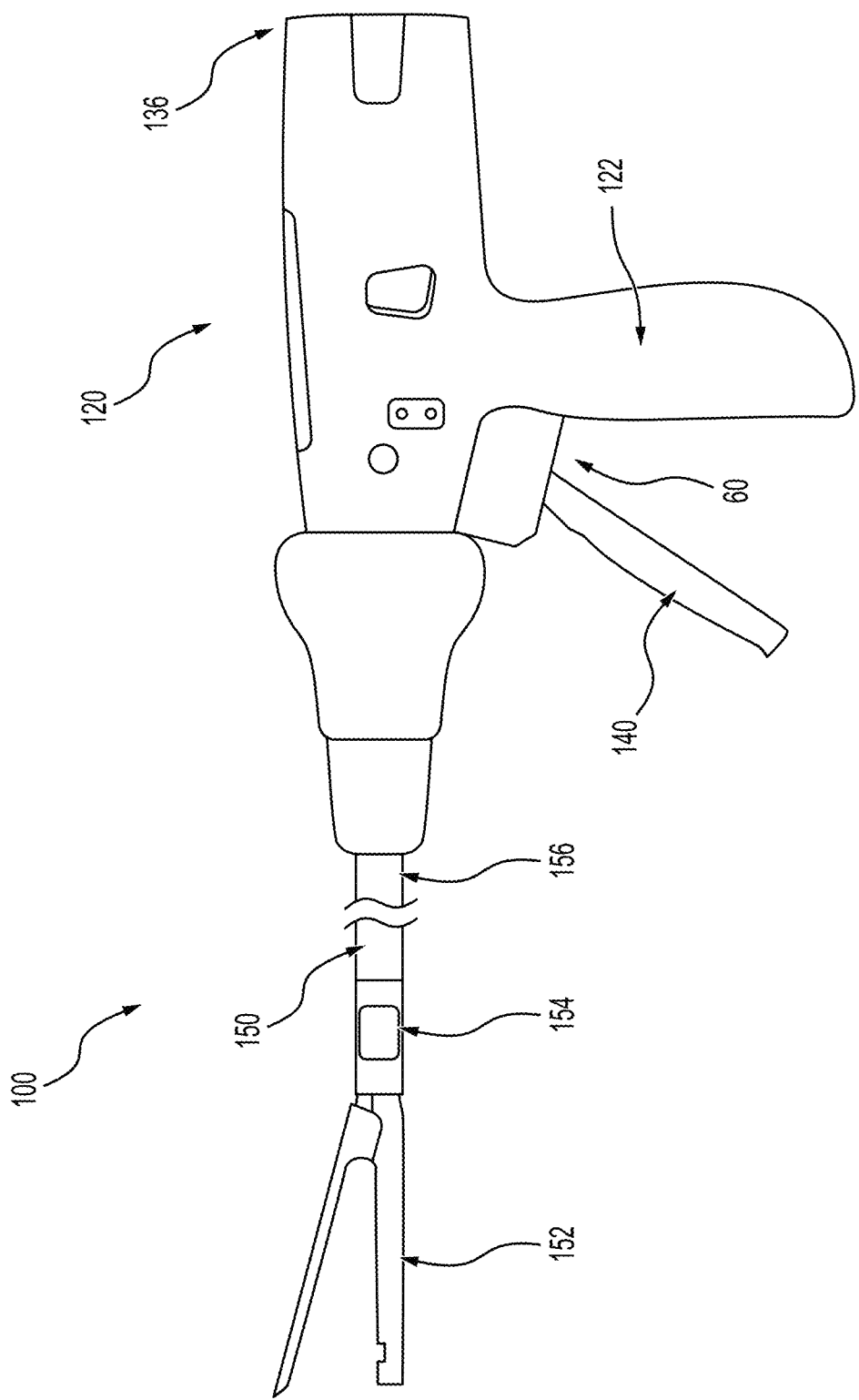
FIG. 1 is a side view of a surgical instrument, in accordance with an example of the disclosed technology.
Figure 2:
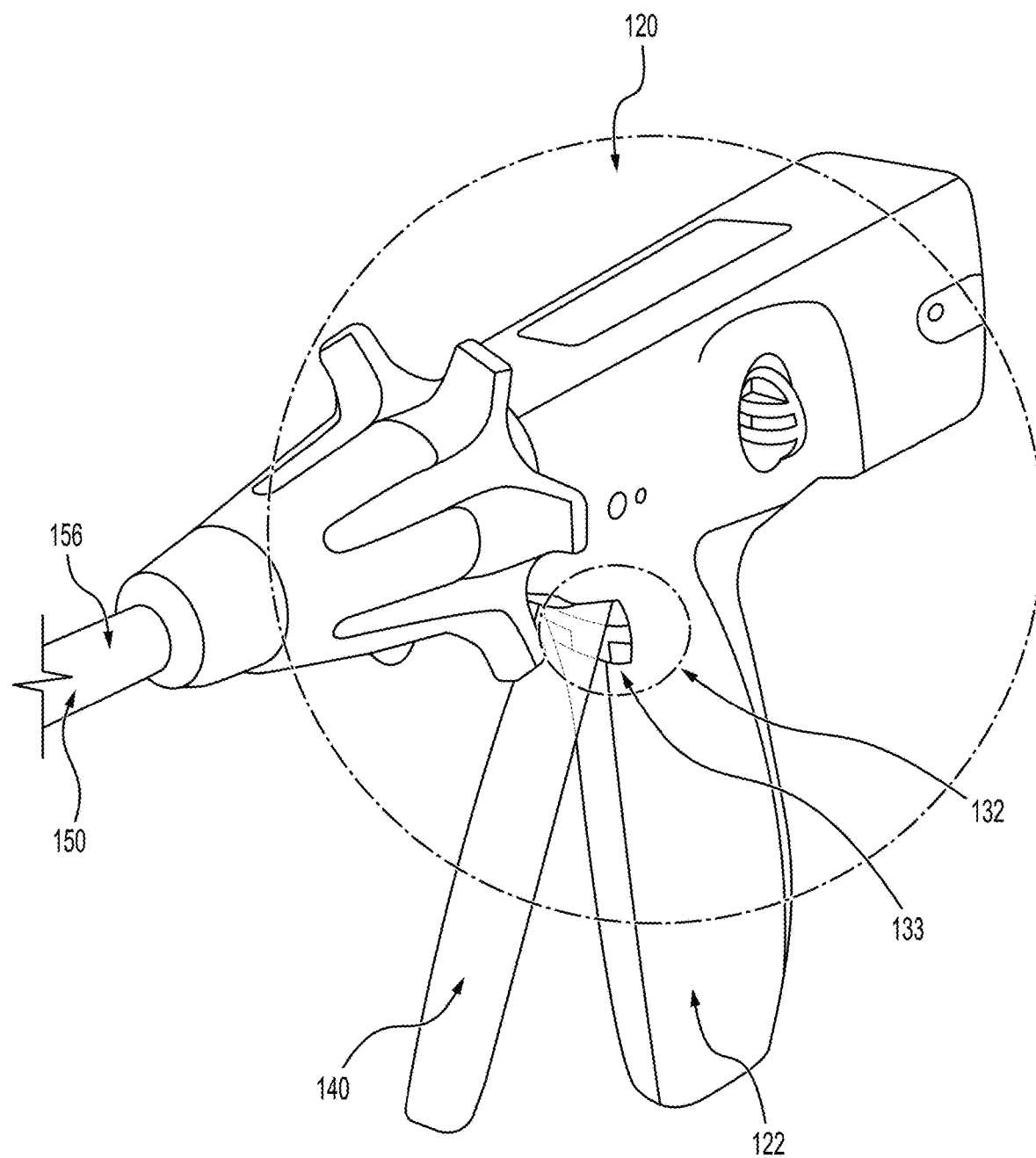
FIG. 2 is a front perspective of a housing of a surgical instrument, in accordance with an example of the disclosed technology.
Figure 4:
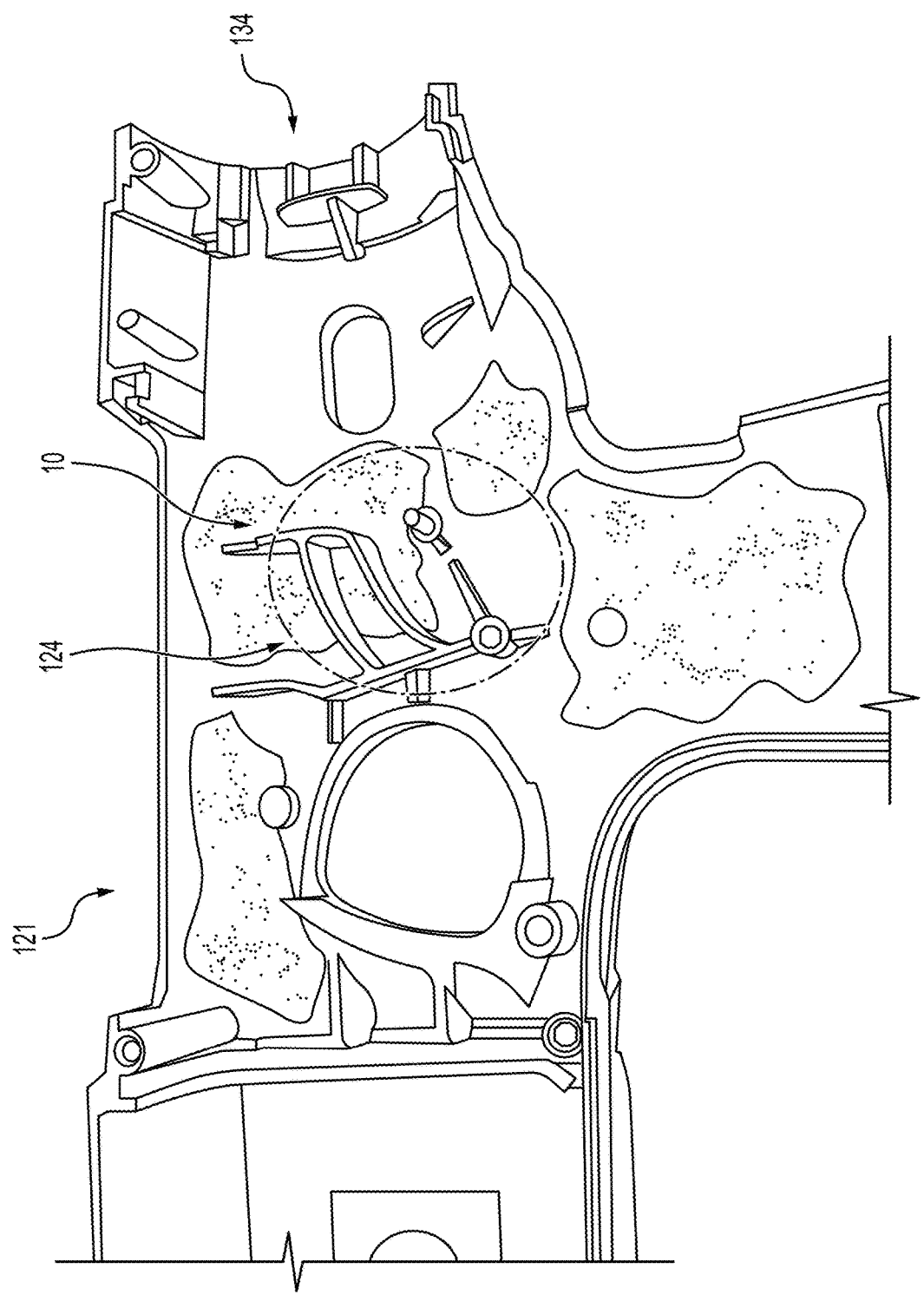
FIG. 4 is an illustration of a first shell or a second shell of a housing for a surgical instrument having particulate disposed on the interior of said first shell or second shell, in accordance with an example of the disclosed technology.

FIG. 1 is a schematic pictorial illustration of a surgical instrument 100. For exemplary purposes, the surgical instrument 100 of the present disclosure may be understood to be a surgical stapler, however it should be appreciated that the present disclosure is not so limited. The surgical stapler may be configured to perform endoscopic procedures on a patient, which may include applying lateral lines of staples to a patient's tissue while transecting said patient's tissue. As illustrated in FIG. 1, the surgical instrument 100 may include a hollow housing 120, wherein the housing 120 may include a first shell 121, a handle portion 122, and a second shell 123. Upon mating the first shell 121 and the second shell 123 of the hollow housing 120, an actuating mechanism space 124 may be formed therebetween the first shell 121 and the second shell 123. The first shell 121 and the second shell 123 of the housing 120, when mated, may form a first opening 132 via a first interface point 133 as shown in FIG. 2. The first shell 121 and the second shell 123, when mated, may also form a second opening 134 as shown in FIG. 4.

As shown in FIG. 1, the surgical instrument 100 may also include a shaft 150, wherein the shaft 150 may include a distal end 154 and a proximal end 156. In some embodiments, the proximal end 156 may be coupled to the housing 120 and the distal end 154 of the shaft 150 may be coupled to an end effector 152, as shown in FIG. 1. As will be appreciated, the end effector of the surgical instrument 100 can be understood as a peripheral apparatus or device that may be configured to interact with a task performed by a physician. In some embodiments, the end effector 152 of the surgical instrument 100 of the present disclosure may be configured to interact with a patient's tissue in open surgery or in endoscopic procedures on a patient's tissue.

The surgical instrument 100 may also include a particulate skirt 60, as shown in FIG. 1. The particulate skirt 60 may include a trigger aperture 68, which can be sized and shaped to accept at least a portion of the trigger 140. The particulate skirt 60 may be configured to capture particulate 10 that may egress from various locations within the housing 120, such as the actuating mechanism space 124, via the first opening 132 during unpackaging of the surgical instrument 100. The particulate skirt 60 can also be configured to withstand a sterilization process. The present disclosure contemplates sterilization processes that may include but not be limited to steam sterilization, unsaturated chemical vapor, dry heat, and the like.

As one skilled in the art will appreciate, surgical instruments are sterilized prior to packaging and transportation, which is crucial to mitigate risks of contamination prior to use. Given that the particulate skirt 60 may be sterilized with the surgical instrument 100 prior to packaging, the risk of contamination as a result of removably attaching the particulate skirt 60 can be mitigated. Particulate 10, as shown in FIG. 4, may be generated from the surgical instrument 100 during transportation and manufacturing of the surgical instrument 100. The presence of the particulate 10 upon unpackaging of the surgical instrument 100 can be disadvantageous for practitioners. Therefore, using the particulate skirt 60 during manufacturing and transportation of the surgical instrument 100 can be advantageous as it can capture particulate 10 from the housing 120 during unpackaging while maintaining sterility of the surgical instrument 100.

FIG. 2 illustrates the housing 120 of the surgical instrument 100. As shown in FIG. 2, the proximal end 156 of the shaft 150 may be coupled to the surgical instrument 100. In some embodiments, the trigger 140 may be configured to translate within the first opening 132 and can thereby actuate the end effector 152. The trigger 140 may be translated toward the handle portion 122 of the surgical instrument 100, wherein the practitioner can determine a degree of actuation for the end effector 152.

Figure 3:
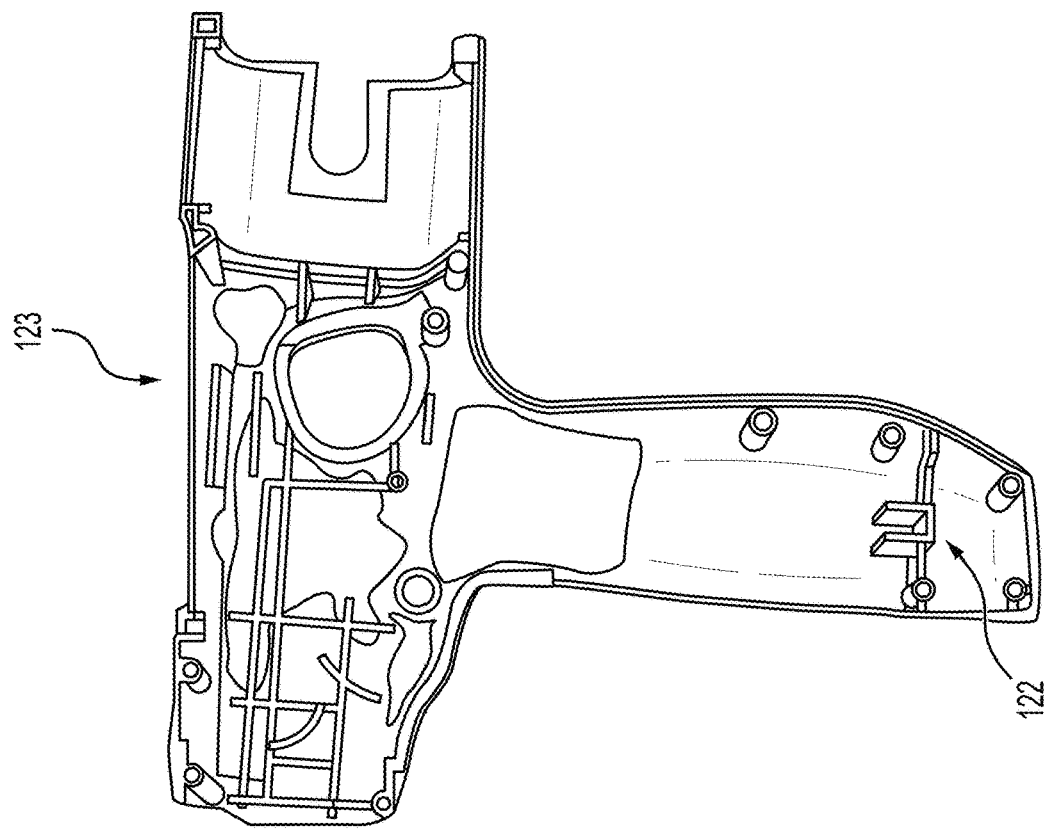
FIG. 3 is an illustration of a first shell and a second shell of a housing for a surgical instrument, in accordance with an example of the disclosed technology.
Figure 3:
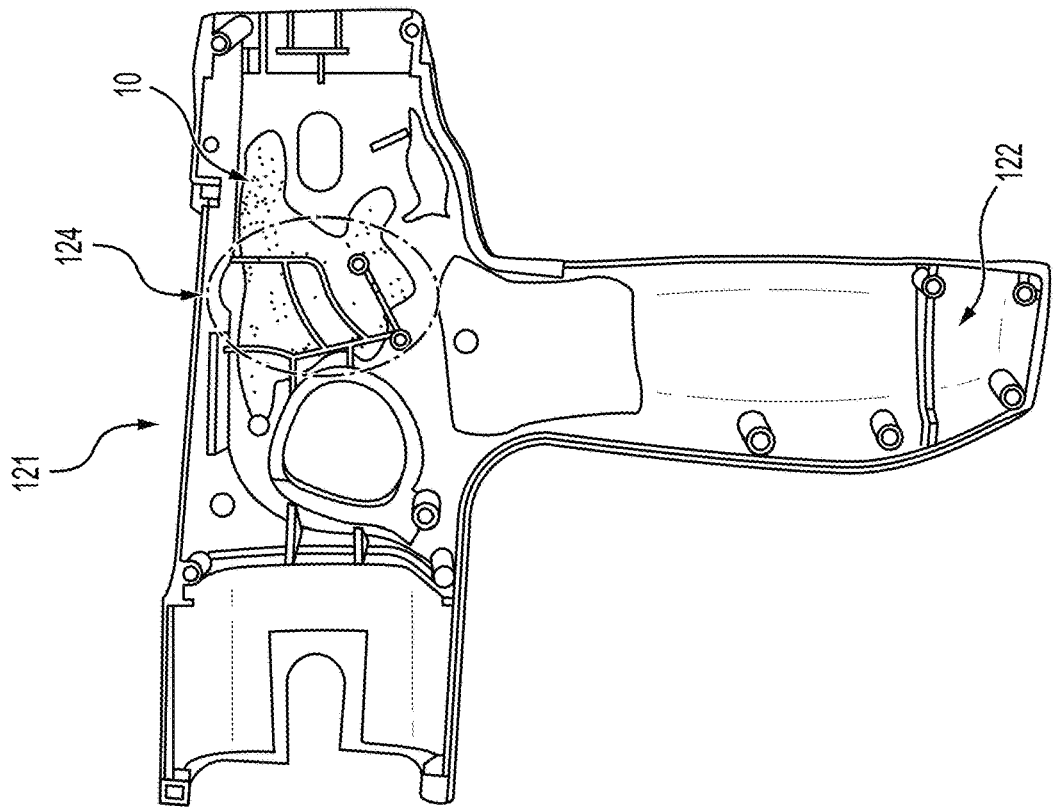

FIGS. 3 and 4 illustrate the interior of the first shell 121 and the second shell 123 of the housing 120 for the surgical instrument 100 with particulate 10 visibly shown on the interior of the first shell 121 and the second shell 123. Particulate 10 can be generated from the manufacturing and transportation of the surgical instrument 100 and can aggregate in the actuating mechanism space 124, as shown in FIGS. 3 and 4. It should be appreciated, however, that particulate 10 may aggregate and move to other locations of the housing 120 during transportation and assembly of the surgical instrument 100. In some embodiments, the particulate 10 may have dimensions of at least about 0.5 mm by about 1 mm.

Figure 5A:
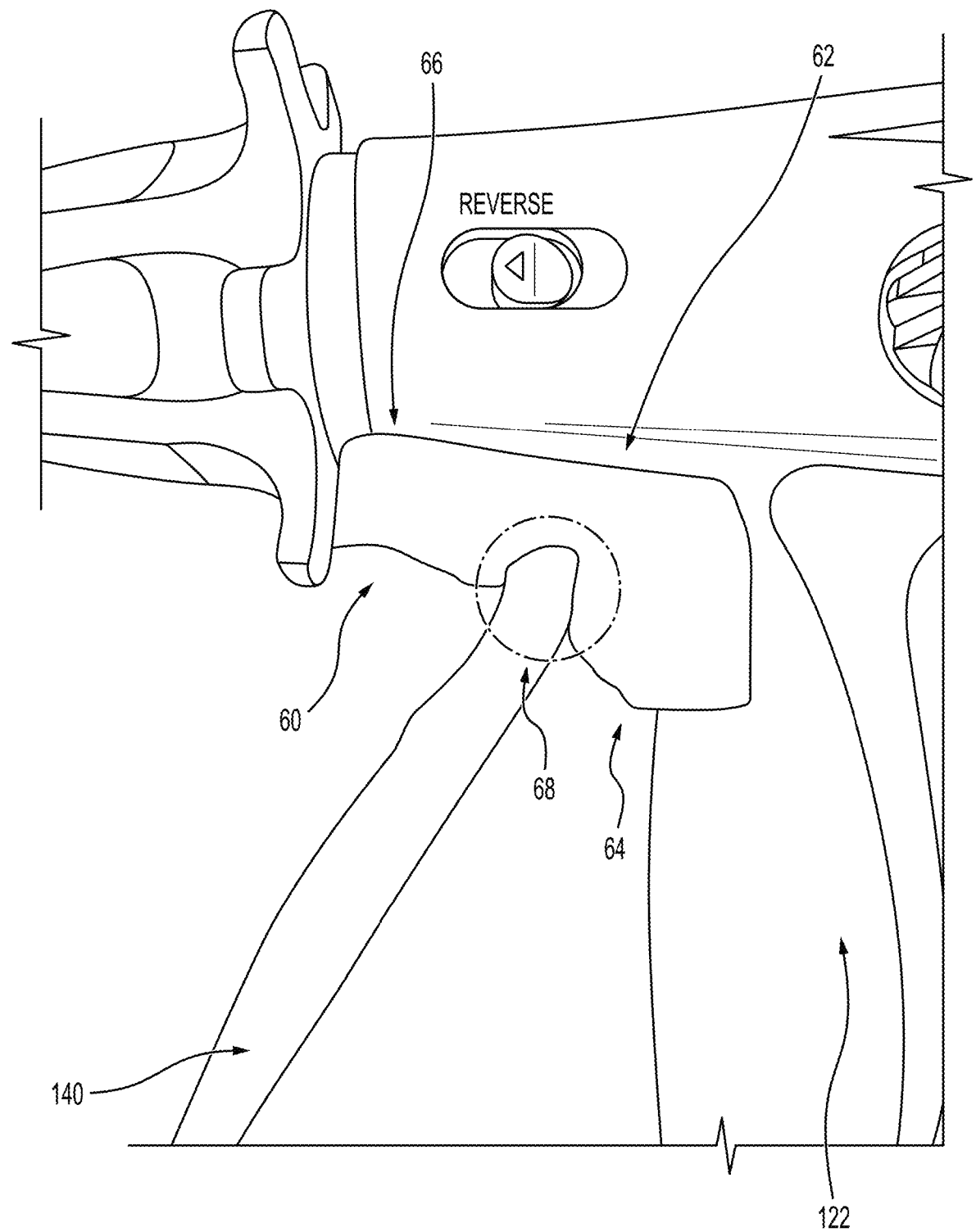
FIG. 5A is a side view of a surgical instrument with a particulate skirt affixed over a first opening of the surgical instrument, in accordance with an example of the disclosed technology.
Figure 5B:
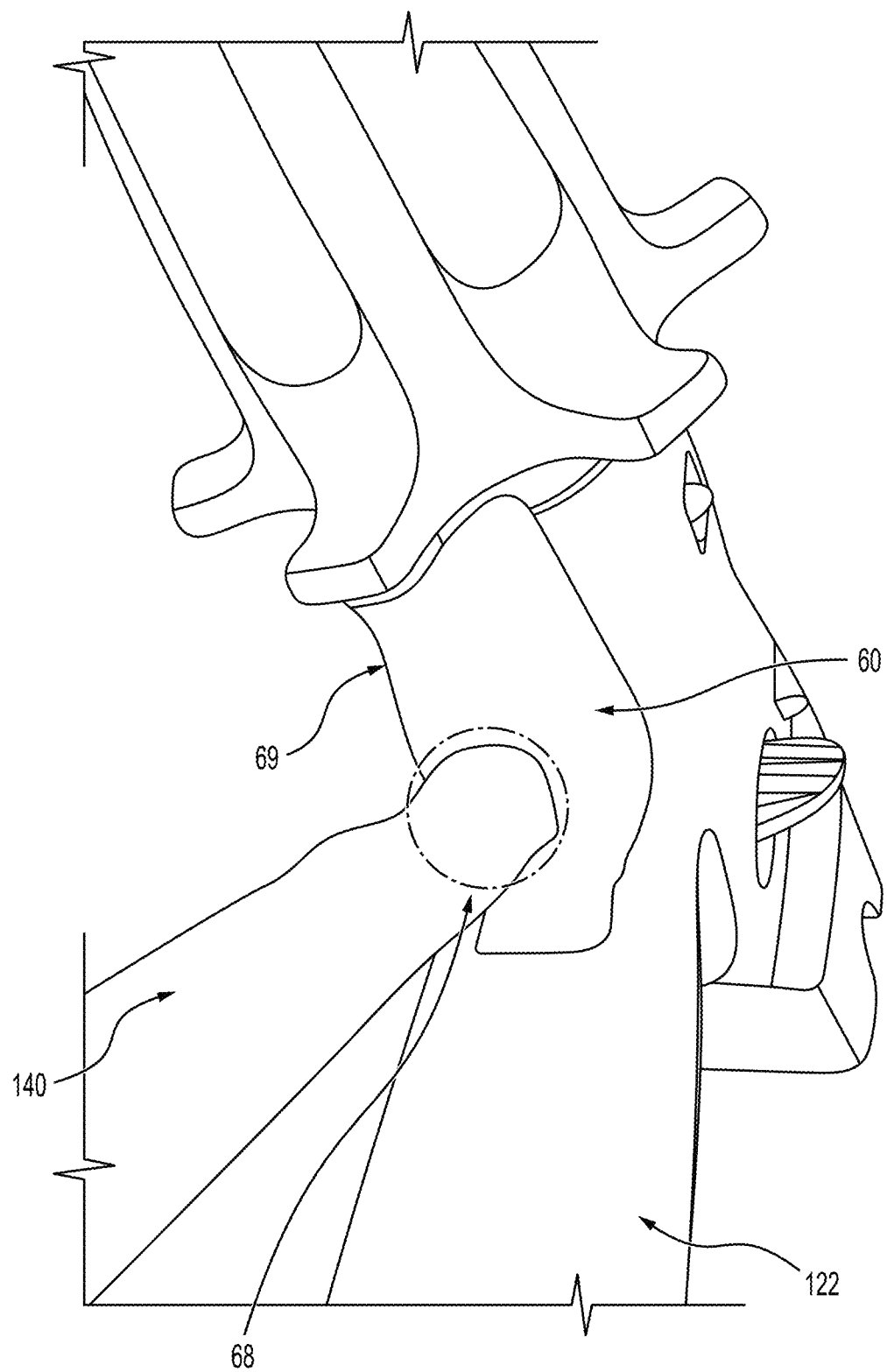
FIG. 5B is a bottom perspective view of a surgical instrument with a particulate skirt affixed over a first opening of the surgical instrument; in accordance with an example of the disclosed technology.

FIGS. 5A-5B show a side view and a bottom view, respectively, of the particulate skirt 60 affixed to the surgical instrument 100. The particulate skirt, as shown in FIGS. 5A-5B, may be disposed over the first opening 132 of the surgical instrument 100. The particulate skirt 60 may include a first side 62, disposed on the interior of the particulate skirt 60, and a second side 64 disposed opposite the first side of the particulate skirt 60. The first side 62 may include an adhesive 66 configured to capture particulate 10 egressing from the first opening 132 of the housing 120. The present disclosure contemplates examples of adhesives including but not limited to cured adhesives, electrostatic adhesives, polyurethane, and the like. In some embodiments, the adhesive 66 may be configured to capture particulate 10 with a dimensional size of at least 0.5 mm by 1 mm. The adhesive 66, in certain examples, can be used to both adhere the particulate skirt 60 to the housing 120 and capture particulates 10 that attempt to exit through the first opening 132.

In some embodiments, the particulate skirt 60 may be disposed partially within the first opening 132 of the housing 120, extending along the housing 120 toward the handle portion 122 as shown in FIGS. 5A-5B. For example, the particulate skirt 60 can be in the form of an elastomeric seal disposed within the first opening 132 of the housing 120. As one skilled in the art will appreciate, the particulate skirt 60 as an elastomeric seal can reduce the amount of open space near the first opening 132 of the housing 120 of the surgical instrument 100, resultantly preventing the egress of any particulate 10 from the first opening 132 of the housing 120. In some embodiments, the particulate skirt 60 may include an opaque material, such as black polycarbonate, and can be removed from the first opening 132 of the housing 120. The particulate skirt 60 can be removed by hand without the use of tools upon unpackaging the surgical instrument 100. For example, the practitioner may remove the particulate skirt 60 by sliding it off the trigger 140 via the trigger aperture 68 prior to operating the surgical instrument 100, as shown in FIGS. 5A-5B.

An alternate exemplary embodiment of the particulate skirt 60, with respect to the present disclosure, may be formed via a soft overmolding process utilizing an opaque material. As one skilled in the pertinent art will appreciate, "soft overmolding" or "soft touch overmolding" is the process of creating a plastic fixture and overlaying a softer material on the plastic fixture for ergonomic comfort and support for a user. With respect to the present disclosure, the particulate skirt 60 may be a soft overmolded fixture affixed at least partially within the first opening of the housing 120, which can allow longitudinal translation of the trigger 140 via the trigger aperture 68. The trigger aperture 68 may be configured to receive at least a portion of the trigger 140.

The "soft touch overmolding" particulate skirt 60 may be advantageous as the trigger aperture 68 can be sized to prevent particulate 10 from egressing through the first opening without obstructing translation of the trigger 140. Additionally, the "soft touch overmolding" particulate skirt 60 may be advantageous as it can remain within the first opening 132 of the housing 120 without compromising operability of the surgical instrument 100. As one skilled in the art can appreciate, the "soft touch overmolding" particulate skirt 60 can operate as a type of gasket seal, which can mitigate the egress of particulate 10 from the first opening 132. In some embodiments, a single portion of elastomeric material can be overmolded onto each of the first shell 121 and the second shell 123, including approximately half of the particulate skirt 60. Upon mating the first shell 121 and the second shell 123 during assembly, the elastomeric material can form a slit parallel to the translation of the trigger, which can allow rotational movement. In other words, when the first shell 121 and second 123 shell of the housing 120 are assembled together, the overmolded elastomeric material from both the first shell 121 and the second shell 123, in conjunction with the particulate skirt 60, can create an opening allowing unobstructed rotational movement of the trigger 140.

Figure 6:
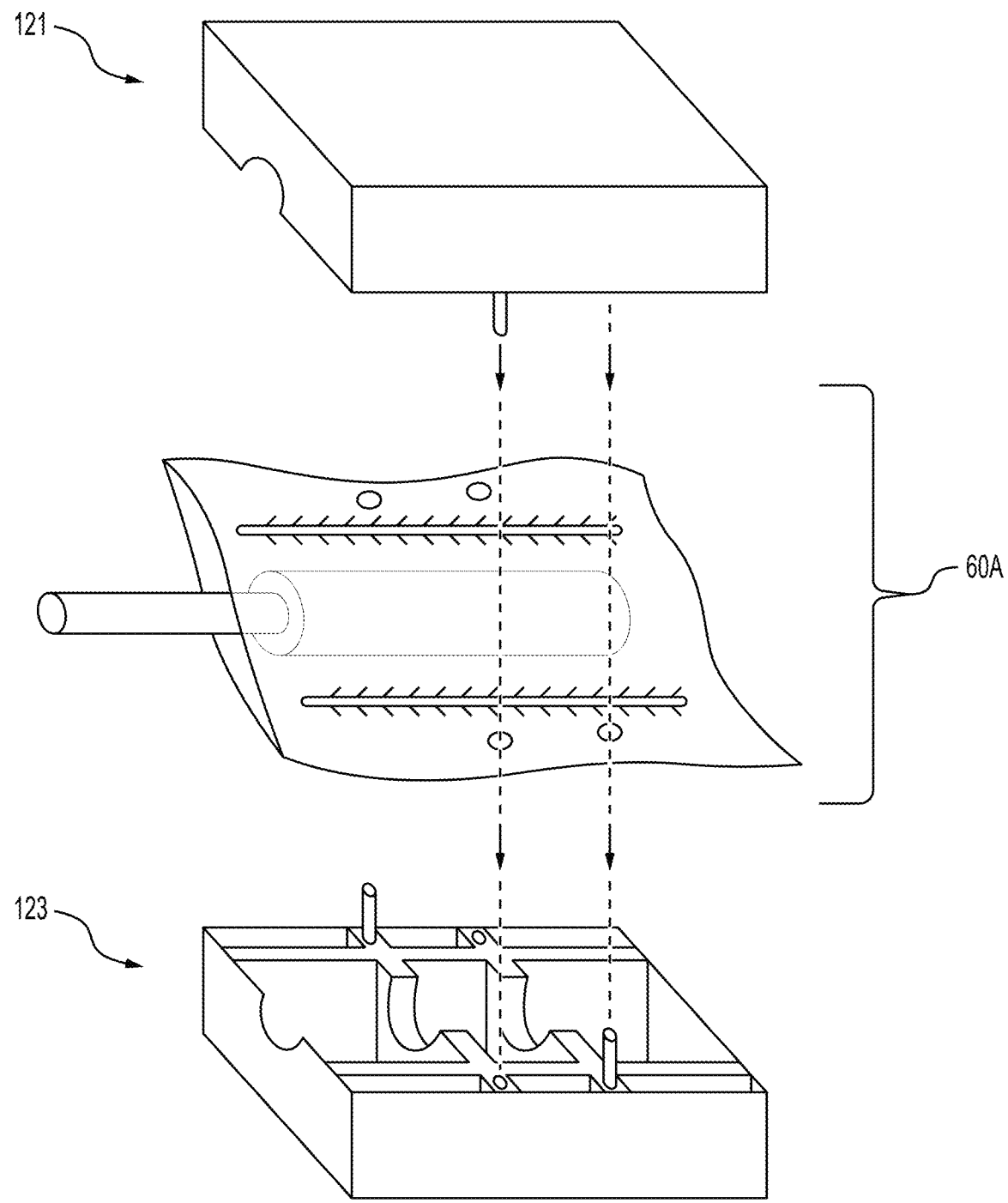
FIG. 6 is an illustration of an alternate example technology for mitigation of particulate during assembly of a surgical instrument, in accordance with an example of the disclosed technology.

FIG. 6 is an illustration of an alternate embodiment of a particulate skirt 60 used for mitigation of particulate 10 during assembly of the surgical instrument 100. In some embodiments, the particulate skirt 60 can be a particulate film 60A, as shown in FIG. 6, and can be disposed within the actuating mechanism space 124 of the housing 120. For example, in the case of a surgical stapler, the particulate film 60A may envelop one or more actuating members within the actuating mechanism space 124 (see FIG. 3), wherein the one or more actuating members may generate particulate 10 during transportation or assembly of the surgical stapler. Placement of the particulate film 60A within the housing 120, as shown in FIG. 6, may be advantageous as it can prevent displacement of particulate 10 from various locations within the housing 120 toward the first opening 132 of the housing 120. In some embodiments, the one or more particulate films 60A can be used to envelop each of the one or more actuating members that can generate particulate 10. Enveloping each of the one or more actuating members in its own respective particulate film 60A can be advantageous as it can further silo or isolate particulate 10 generated in each of the one or more actuating members from migrating to other areas within the housing 120.

Figure 7:
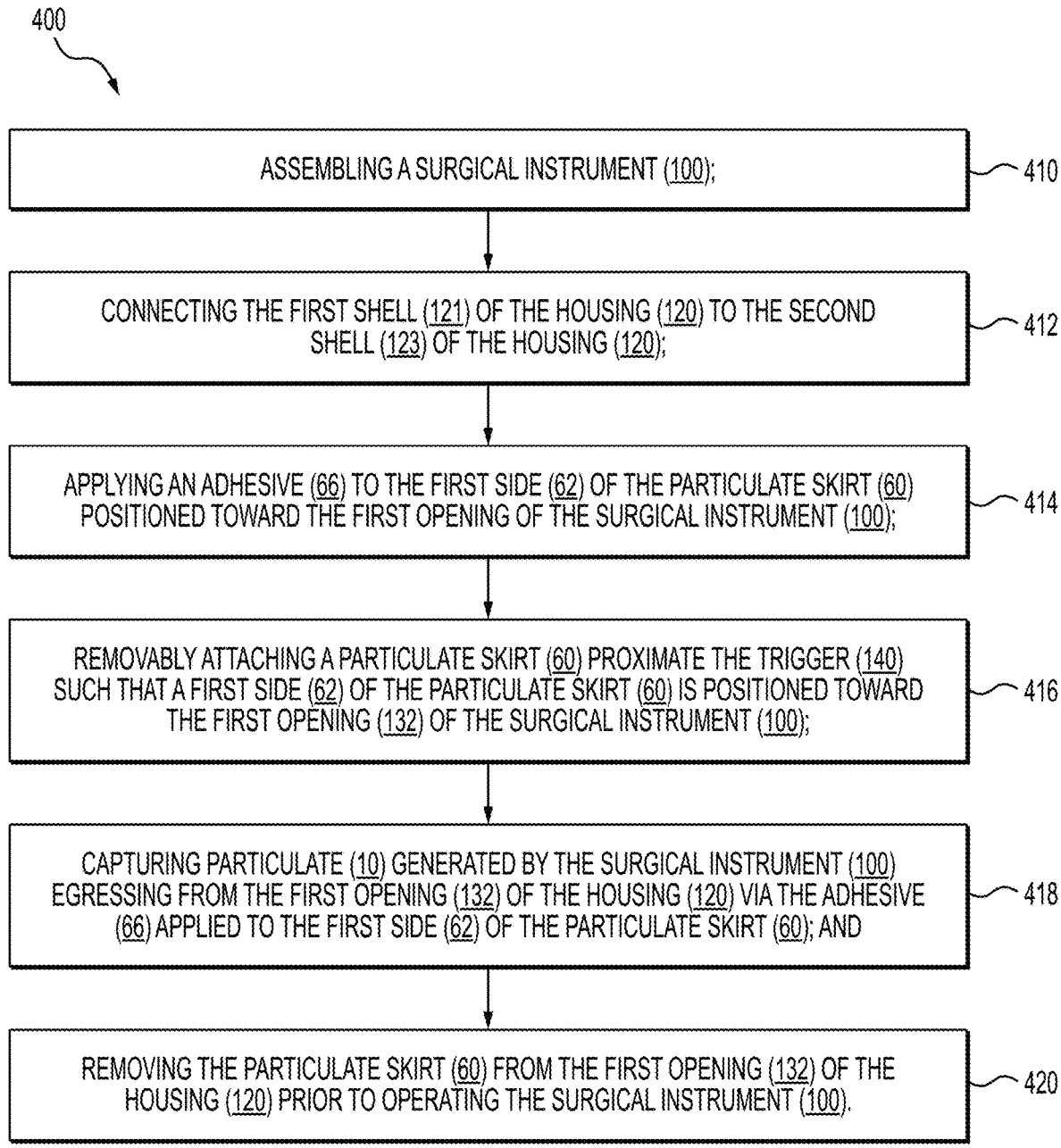
FIG. 7 is a method flow chart for a method of manufacture of a surgical instrument, in accordance with an example of the disclosed technology.

FIG. 7 is a method flow chart 400 for a method of manufacture of the surgical instrument 100. The method 400 may include assembling the surgical instrument 410, wherein the surgical instrument 100 may include a hollow housing 120, a trigger 140, and a particulate insert 60. The housing 120 may include a first shell 121, a handle 122, and a second shell 123. The next method step 412 may include connecting the first shell 121 of the housing 120 to the second shell 123 of the housing 120. In some embodiments, mating the first shell 121 and the second shell 123 can create a first opening 132 at a first interface point 133 and/or a second opening 134, between the first shell 121 and the second shell 123.

The next method step 414 may include applying an adhesive 66 to a first side 62 of the particulate skirt 60. In some embodiments, the first side 62 of the particulate skirt may be positioned toward the first opening 132 of the surgical instrument 100. Positioning the first side 62 of the particulate skirt 60 to the first opening 132 may be advantageous as the adhesive 66 can be configured to captured particulate 10 egressing from the first opening 132. The next method step 416 may include removably attaching a particulate skirt 60 proximate the trigger 140 such that a first side 62 of the particulate skirt 60 is positioned toward the first opening 132 of the surgical instrument 100. In some embodiments, at least a portion of the particulate skirt 60 can be placed within the first opening 132 of the housing 120 of the surgical instrument 100. The next method step 418 may include capturing particulate 10 generated by the surgical instrument 100 egressing from the first opening 132 of the housing 120 via the adhesive 66 applied to the first side 62 of the particulate skirt 60. The next method step 420 may include removing the particulate skirt 60 from the first opening 132 of the housing 120 prior to operating the surgical instrument 100.

The disclosed technology described herein can be further understood according to the following clauses:

Clause 1: A surgical instrument 100 comprising: a hollow housing 120 comprising: a first shell 121 and a second shell 123 forming an actuating mechanism space 124 therebetween; a handle portion 122; and a first opening 132 formed at a first interface point 133 of the first shell 121 and the second shell 123; a trigger 140 extending from the first opening 132; and a particulate skirt 60 configured to capture particulate 10 from the actuating mechanism space 124 and prevent particulate 10 from exiting the housing 120 through the first opening 132, the particulate skirt 60 comprising a trigger aperture 68 sized and shaped to accept a portion of the trigger 140 therethrough.

Clause 2: The surgical instrument 100 according to Clause 1, wherein the surgical instrument 100 further comprises a second opening 134 formed at a second interface point 136 of the first shell 121 and the second shell 123.

Clause 3: The surgical instrument 100 according to Clause 2, wherein the surgical instrument 100 further comprises a shaft 150 comprising a proximal end 156 and a distal end 154, the proximal end 156 of the shaft 150 being connected to the housing 120, the distal end 154 of the shaft 150 being connected to an end effector 152.

Clause 4: The surgical instrument 100 according to any of the preceding Clauses, wherein the particulate skirt 60 further comprises a first side 62 disposed on the interior of the particulate skirt 60 and proximate the first opening 132 of the housing 120, the first side 62 comprising an adhesive 66 configured to capture particulate 10 egressing from the first opening 132 of the housing 120; and a second side 64 disposed opposite the first side 62 of the particulate skirt 60.

Clause 5: The surgical instrument 100 according to any of the preceding Clauses, wherein the adhesive 66 is selected from the group of cured adhesives and electrostatic adhesives.

Clause 6: The surgical instrument 100 according to any of the preceding Clauses, wherein the particulate skirt 60 further comprises an opaque material 69.

Clause 7: The surgical instrument 100 according to any of the preceding Clauses, wherein the adhesive 66 is configured to withstand a sterilization process.

Clause 8: The surgical instrument 100 according to any of the preceding Clauses, wherein the adhesive 66 comprises polyurethane.

Clause 9: The surgical instrument 100 according to any of the preceding Clauses, wherein the adhesive 66 is configured to capture particulate 10 having dimensional parameters of at least 0.5 mm by 1 mm.

Clause 10: The surgical instrument 100 according to any of the preceding Clauses, wherein at least a portion of the particulate skirt 60 is disposed within the first opening 132 of the housing 120, extending along the housing 120 proximate the handle portion 122.

Clause 11: The surgical instrument 100 according to any of the preceding Clauses, wherein the particulate skirt 60 is removable from the first opening 132.

Clause 12: The surgical instrument 100 of Clause 1, wherein the particulate skirt 60 is formed via a soft overmolding process.

Clause 13: The surgical instrument 100 according to Clause 12, wherein the particulate skirt 60 is configured to allow translation of the trigger 140 through at least a longitudinal portion of the particulate skirt 60, the skirt 60 comprising a trigger aperture 68 sized and shaped to accept the trigger 140.

Clause 14: The surgical instrument 100 according to Clause 12 or Clause 13, wherein the particulate skirt 60 is formed from an opaque material 69.

Clause 15: A method 400 of manufacturing a surgical instrument 100, the method (400) comprising assembling a surgical instrument 100 (410) comprising: a hollow housing 120 comprising a first shell 121 and a second shell 123 forming an actuating mechanism space 124 therebetween; a handle portion 122; and a first opening 132 formed at a first interface point 133 of the first shell 121 and the second shell 123; a trigger 140 extending from the first opening 132; and a particulate skirt 60 configured to capture particulate 10 from the actuating mechanism space 124 and prevent particulate 10 from exiting the housing 120 through the first opening 132, the particulate skirt 60 comprising a trigger aperture 68 sized and shaped to accept a portion of the trigger 140 therethrough; connecting the first shell 121 of the housing 120 to the second shell 123 of the housing 120 (412); and removably attaching a particulate skirt 60 proximate the trigger 140 such that the first side 62 of the particulate skirt 60 is positioned toward the first opening 132 of the surgical instrument 100 (416).

Clause 16: The method 400 according to Clause 15, further comprising the step of applying an adhesive 66 to the first side 62 of the particulate skirt 60 positioned toward the first opening 132 of the surgical instrument 100 (414).

Clause 17: The method 400 according to Clause 15 or Clause 16, further comprising the step of capturing particulate 10 generated by the surgical instrument 100 egressing from the first opening 132 of the housing 120 via the adhesive 66 applied to the first side 62 of the particulate skirt 60 (418).

Clause 18: The method 400 according to any one of Clauses 15 to Clause 17, wherein attaching a particulate skirt 60 further comprises placing at least a portion of the particulate skirt 60 within the first opening 132 of the housing 120 of the surgical instrument 100.

Clause 19: The method (400) according to any one of Clauses 15 to Clause 18, wherein the method (400) further comprises the step of removing the particulate skirt 60 from the first opening 132 of the housing 120 prior to operating the surgical instrument 100 (420).

Clause 20: The method of any one of Clauses 15 to Clauses 19 wherein capturing particulate 10 generated by the surgical instrument 100 egressing from the first opening of the housing 120 via the adhesive 66 applied to the first side 62 of the particulate skirt 60 comprises: adhering particulate 10 having dimensional parameters of at least 0.5 mm by 1 mm to the first side 62 of the particulate skirt 60 egressing from the first opening 132 of the housing 120.

Any of the examples or embodiments described herein may include various other features in addition to or in lieu of those described above. The teachings, expressions, embodiments, examples, etc. described herein should not be viewed in isolation relative to each other. Various suitable ways in which the teachings herein may be combined should be clear to those skilled in the art in view of the teachings herein.

Having shown and described exemplary embodiments of the subject matter contained herein, further adaptations of the methods and systems described herein may be accomplished by appropriate modifications without departing from the scope of the claims. In addition, where methods and steps described above indicate certain events occurring in certain order, it is intended that certain steps do not have to be performed in the order described but in any order as long as the steps allow the embodiments to function for their intended purposes.

Therefore, to the extent there are variations of the invention, which are within the spirit of the disclosure or equivalent to the inventions found in the claims, it is the intent that this patent will cover those variations as well. Some such modifications should be apparent to those skilled in the art. For instance, the examples, embodiments, geometrics, materials, dimensions, ratios, steps, and the like discussed above are illustrative. Accordingly, the claims should not be limited to the specific details of structure and operation set forth in the written description and drawings.

What is claimed is:

1. A surgical instrument, comprising:
    a hollow housing comprising:
        a first shell and a second shell forming an actuating mechanism space therebetween;
        a handle portion; and
        a first opening formed at a first interface point of the first shell and the second shell;
    a trigger extending from the first opening; and
    a particulate skirt configured to capture particulate from the actuating mechanism space and prevent the particulate from exiting the housing through the first opening, the particulate skirt comprising a trigger aperture sized and shaped to accept at least a portion of the trigger therethrough.

2. The surgical instrument according to claim 1 wherein the surgical instrument further comprises:
    a second opening formed at a second interface point of the first shell and the second shell.

3. The surgical instrument according to claim 2, wherein the surgical instrument further comprises a shaft comprising a proximal end and a distal end, the proximal end of the shaft being connected to the housing, the distal end being connected to an end effector.

4. The surgical instrument according to claim 1, wherein the particulate skirt further comprises:
   a first side disposed on the interior of the particulate skirt and proximate the first opening of the housing, the first side comprising an adhesive configured to capture particulate egressing from the first opening of the housing; and
   a second side disposed opposite the first side of the particulate skirt.

5. The surgical instrument according to claim 4, wherein the adhesive is selected from the group of cured adhesives and electrostatic adhesives.

6. The surgical instrument according to claim 4, wherein the particulate skirt further comprises an opaque material.

7. The surgical instrument according to claim 4, wherein the adhesive is configured to withstand a sterilization process.

8. The surgical instrument according to claim 4, wherein the adhesive comprises polyurethane.

9. The surgical instrument according to claim 4, wherein the adhesive is configured to capture particulate having dimensional parameters of at least 0.5 mm by 1 mm.

10. The surgical instrument according to claim 1, wherein at least a portion of the particulate skirt is disposed within the first opening of the housing, extending along the housing proximate the handle portion.

11. The surgical instrument according to claim 10, wherein the particulate skirt is removable from the first opening.

12. The surgical instrument of claim 1, wherein the particulate skirt is formed via a soft overmolding process.

13. The surgical instrument of claim 12, further comprising an end effector wherein the particulate skirt is configured to allow translation of the trigger through at least a longitudinal portion of the particulate skirt, the particulate skirt comprising a trigger aperture sized and shaped to accept the trigger
   wherein the trigger moves from a first position to a second position, the first position corresponding to the end effector having a jaw open state and the second position corresponding to the end effector having a closed jaw state.

14. The surgical instrument of claim 13 wherein the particulate skirt is formed from an opaque material.

* * * * *